(12) United States Patent
Voigt et al.

(10) Patent No.: US 9,393,766 B2
(45) Date of Patent: Jul. 19, 2016

(54) PROCESS FOR JOINING A FOIL OR A MEMBRANE

(75) Inventors: Markus Voigt, Dortmund (DE); Thomas Willms, Castrop-Rauxel (DE)

(73) Assignee: Boehringer Ingelheim Microparts GmbH, Dortmund (DE)

( * ) Notice: Subject to any disclaimer, the term of this patent is extended or adjusted under 35 U.S.C. 154(b) by 713 days.

(21) Appl. No.: 13/462,211

(22) Filed: May 2, 2012

(65) Prior Publication Data

US 2013/0112349 A1    May 9, 2013

(30) Foreign Application Priority Data

May 9, 2011 (EP) ...................................... 11165375

(51) Int. Cl.
*B32B 37/10* (2006.01)
*B26F 1/02* (2006.01)
(Continued)

(52) U.S. Cl.
CPC .............. *B32B 37/1009* (2013.01); *B26F 1/02* (2013.01); *B29C 65/18* (2013.01); *B29C 65/7457* (2013.01); *B29C 65/7847* (2013.01); *B29C 66/00441* (2013.01); *B29C 66/472* (2013.01); *B29C 66/53461* (2013.01); *B29C 66/81425* (2013.01); *B29C 66/81427* (2013.01); *B29C 66/919* (2013.01); *B29C 66/91421* (2013.01); *B29C 66/929* (2013.01); *B29C 66/949* (2013.01); *B26D 7/1818* (2013.01); *B26D 7/1863* (2013.01); *B29C 65/08* (2013.01); *B29C 65/48* (2013.01); *B29C 65/7802* (2013.01); *B29C 65/7841* (2013.01); *B29C 66/02241* (2013.01); *B29C 66/8122* (2013.01);
(Continued)

(58) Field of Classification Search
CPC  B29C 65/18; B29C 65/7457; B29C 65/7802; B29C 66/53461; B29C 66/832; B26F 1/02
See application file for complete search history.

(56) References Cited

U.S. PATENT DOCUMENTS 2,076,079 A      4/1937  Gammeter
2,081,716 A  *   5/1937  Scholl ........................... 128/894
(Continued)

FOREIGN PATENT DOCUMENTS

CH              687366 A5    11/1996
FR          2511294 A1  *    2/1983
(Continued)

OTHER PUBLICATIONS

Machine translation of FR2511294.*
(Continued)

*Primary Examiner* — Christopher Schatz
(74) *Attorney, Agent, or Firm* — Michael P. Morris; Mary-Ellen M. Devlin

(57) ABSTRACT

Process for joining a foil or a membrane.
The invention relates to a method for joining at least one foil-like or membrane-like part to a structural part (9), wherein the foil-like or membrane-like part is separated by means of a tool (2) from a semi-finished product (3) and is held on the tool (2) by applying a reduced pressure, and wherein the foil-like or membrane-like part is placed on the structural part (9), and is in turn held on this (9) and joined to this (9) by applying a reduced pressure.
By means of the method a precise, reliable and readily automatable joining of a foil-like or membrane-like part to a structural part (9) is possible.
A device (1) is also proposed, with which the method according to the invention can readily be carried out.

9 Claims, 3 Drawing Sheets

Figure 1:
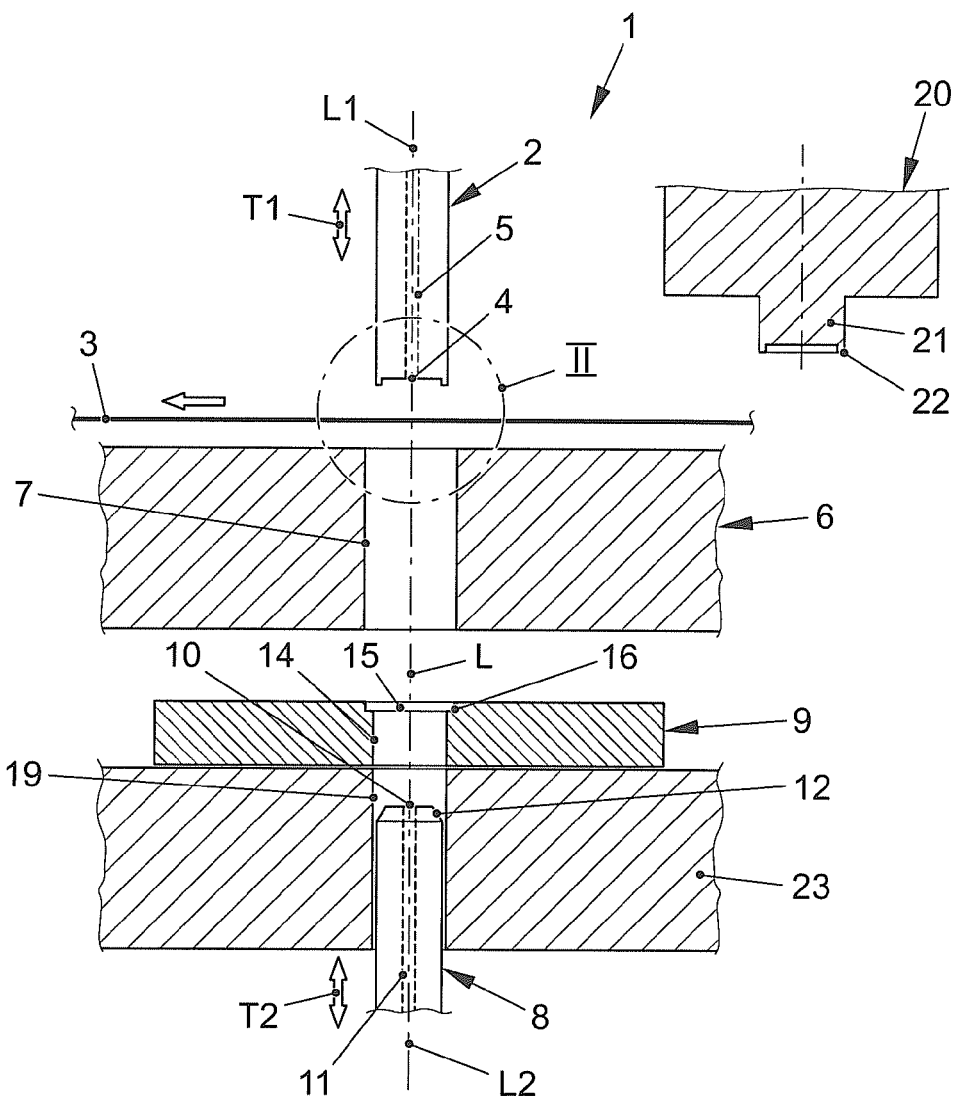

(51) Int. Cl.
  *B29C 65/18*  (2006.01)
  *B29C 65/74*  (2006.01)
  *B29C 65/00*  (2006.01)
  *B26D 7/18*  (2006.01)
  *B29C 65/08*  (2006.01)
  *B29C 65/48*  (2006.01)
  *B29C 65/78*  (2006.01)

(52) U.S. Cl.
  CPC ...... *B29C 66/832* (2013.01); *B29C 2793/0045* (2013.01); *Y10T 156/17* (2015.01)

(56) References Cited

U.S. PATENT DOCUMENTS

| | | | |
|---|---|---|---|
| 4,675,017 A | 6/1987 | Sato | |
| 6,355,134 B1 * | 3/2002 | Berndt et al. | 156/311 |
| 2009/0113700 A1 * | 5/2009 | Cook | 29/822 |

FOREIGN PATENT DOCUMENTS

| | | |
|---|---|---|
| JP | 56129130 | 3/1981 |
| JP | S5859057 A | 4/1983 |
| JP | S61206445 A | 9/1986 |
| WO | 2012152798 A1 | 11/2012 |

OTHER PUBLICATIONS

Abstract of FR2511294.*
Full Tranlation of FR 2511294.*
International Search Report and Written Opinion for PCT/EP2012/058469 mailed Aug. 21, 2012.
Abstract in English of CH687366, 1996.
Abstract in English of JP56129130, 1981.
Abstract in English of JPS5859057, 1983.

* cited by examiner

PROCESS FOR JOINING A FOIL OR A MEMBRANE

The present invention relates to a method for joining at least one foil-like or membrane-like part to a structural part, as well as a device for carrying out the method.

In many technical applications it may be necessary to separate or filter out solids from liquids. For example, in the field of microfluidics it is very often necessary to filter out solids from body fluids such as blood, urine or the like. A specific application is for example the separation of plasma from whole blood. For this purpose often foil-like or membrane-like parts are used as filters, the dimensions of such foil-like or membrane-like parts in terms of their area being many times larger than their thickness. Typical dimensions of such foil-like or membrane-like parts in terms of area are diameters or edge lenths of about 5 to 20 mm, their thickness being in most cases only fractions of a millimetre.

The foil-like or membrane-like parts used for the filtration are—at least in the case of a microfluidic application—generally a component of a microfluidic structural part, comprising corresponding microcavities and microchannels for the accommodation, intermediate storage and transmission of sample liquid, as well as a corresponding evaluation electronics.

The term "micro" indicates in this connection that the channels and/or cavities (chambers) at least in one geometrical dimension have a size in the micrometre range, i.e. the measurements in at least one dimension are less than a millimetre.

The microfluidic structural part produced for example in an injection moulding method can in this connection be equated to a microfluidic cartridge (highly integrated device for the analysis of liquids with corresponding microchambers, microchannels and corresponding evaluation electronics, so-called "Lab-on-Chip") or may also simply be a structural part of such a cartridge.

In order that a foil-like or membrane-like part can in cooperation with a structural part now correctly perform its function (filtration and/or separation of liquids), it is necessary for the foil-like or membrane-like part to be placed precisely on the structural part and then reliably joined thereto.

This requirement naturally increases as the dimensions of the structural parts to be joined become smaller, such as for example in the field of microfluidics.

A method for joining a gas-permeable membrane to a moulded part is known from DE 698 26 454 T2. The joining finally takes place by locally heating the membrane by means of a thermode, under the additional application of pressure.

In DE 10 2009 006 065 A1 a method for the production of a microfluidic device is described, in which first of all a fluid-receiving and/or fluid-transporting structure is formed in a substrate and then at least one microporous membrane is applied to this structure and is joined to the structured substrate. To join the membrane to the structured substrate there is proposed inter alia a cohesive joining method as well as a pressure method.

Finally, a method for joining a porous medium to a substrate is known from DE 694 25 325 T2, in which the porous medium is impregnated with a binder composition and the surface of the substrate is at least somewhat soluble in the said binder composition. In this connection the porous medium is placed in a closed chamber in such a way that it is in contact with or is in the proximity of the substrate surface.

The object of the present invention is now to provide a method for joining at least one foil-like or membrane-like part that is precise and at the same time reliable.

A further object of the invention is to provide a suitable device by means of which the method can be carried out.

The above objects are achieved by the features of claim 1 and claim 11. Advantageous modifications of the invention can be derived from the respective subclaims.

It should again be expressly pointed out that the invention described hereinafter can, apart from the applications in microfluidics simply mentioned by way of example, also be used in other applications in which channels and cavities with significantly larger dimensions than in microfluidics are to be found, and in which for example a pressure-driven liquid transport is necessary.

According to the invention a method for joining at least one foil-like or membrane-like part to a structural part is provided, in which the foil-like or membrane-like part is separated by means of a tool from a semi-finished product and is held on the tool by applying a reduced pressure, and in which the foil-like or membrane-like part is placed on the structural part, and is in turn held on the latter by applying a reduced pressure and is thereby joined to the said structural part.

In this way the foil-like or membrane-like part can be placed very precisely and reliably on the structural part and joined to the latter. In particular, by applying a reduced pressure an unintended slippage or misalignment of the foil-like or membrane-like part can be avoided. The method can moreover be readily and efficiently automated.

A development of the method according to the invention envisages that the release of the foil-like or membrane-like part from the tool is carried out by applying an excess pressure, in particular by means of a compressed air jet. An excess pressure is therefore additionally generated for cancelling the reduced pressure (which can be generated for example by a vacuum source). In this way the release of the foil-like or membrane-like part from the tool can be performed even more reliably and consistently.

The method and the device used therefor can be implemented comparatively simply if for both the separation of the foil-like or membrane-like part from the semi-finished product as well as for the placing of the foil-like or membrane-like part on the structural part, a translational movement from the tool and/or from the structural part carrying the foil-like or membrane-like part is carried out, the axes of the movements lying on a common straight line.

A reliable joining of the foil-like or membrane-like part to the structural part can be achieved if the foil-like or membrane-like part is thermally joined to the structural part under application of heat and pressure.

It has at the same time proved very advantageous if a tool that can be heated to a temperature in a range from about 100° C. to 220° C., preferably from about 193° C. to 199° C., is used to generate heat.

It has also proved convenient if, in order to generate pressure, a tool is employed that acts on the foil-like or membrane-like part with a compressive force in the range from about 50 N to 900 N, preferably from about 250 N to 350 N, particularly preferably from about 294 N to 339 N.

In this connection the tool used to generate heat and pressure should act on the foil-like or membrane-like part for a duration of about 2.5 sec to 3.5 sec, preferably about 3 sec to 3.2 sec. To facilitate the subsequent separation of the tool serving to generate heat and pressure from the foil-like or membrane-like part, it has proved very advantageous if a separating layer is inserted between the tool for generating heat and pressure and the foil-like or membrane-like part. Such a separating layer may for example be a separately provided layer of Teflon or the like. Alternatively, it is also conceivable for the separating layer to be formed by a corresponding coating of the tool itself.

In order to generate as clean a cut edge as possible of the foil-like or membrane-like part produced from the semi-finished product, it has proved very advantageous if the separation of the foil-like or membrane-like part from the semi-finished product takes place under adjustment of a clearance that is many times smaller than the thickness of the foil-like or membrane-like part, preferably in a range from about 0.03 to 0.3 times its thickness, particularly preferably in a range from about 0.05 to 0.2 times its thickness.

As already mentioned, the invention also relates to a device for carrying out the method. Such a device comprises in this connection according to the invention at least a tool for separating the foil-like or membrane-like part from a semi-finished product, the tool being provided with at least one opening that can be fluid mechanically connected to a source generating a reduced pressure and/or excess pressure, a first structural part for the seating of the semi-finished product with a through opening for the tool separating the foil-like or membrane-like part, a second stuctural part for the alignment and/or centering and/or support of the structural part, the said second structural part being provided with at least one opening that can likewise be fluid mechanically connected to a source generating a reduced pressure and/or excess pressure, wherein the first and the second structural parts are positioned relative to one another in such a way that the tool can be moved by means of a translational movement in the direction of the second structural part, and a tool for joining the foil-like or membrane-like part to the structural part.

By these features a device is provided with which the method according to the invention can be reliably carried out and which can also be constructed in a comparatively simple manner.

A modification of the concept of the invention envisages that the tool for separating the foil-like or membrane-like part as well as the second structural part for aligning and/or centering the structural part are formed elongated with in each case one longitudinal mid-axis, wherein also the second structural part can execute a translational movement and the longitudinal mid-axes lie on a common straight line.

It is very convenient if the tool separating the foil-like or membrane-like part is provided on its surface facing towards the second structural part with a raised portion extending along the edge. Such a geometry of the tool facilitates the transfer of the foil-like or membrane-like part to another structural part and reduces the danger of damage to the foil-like or membrane-like part during this transfer. Furthermore possibly occurring interfering electrostatic forces can be overcome more easily by means of such a contour.

Also, it is convenient for the tool used for joining the foil-like or membrane-like part to the structural part if it is provided on its side facing towards the second structural part with a raised portion extending along the edge.

A modification of the invention also envisages that the tool separating the foil-like or membrane-like part and the second structural part for aligning and/or centering the structural part have in each case a circular cross-section. In this way it is possible to achieve an easier guidance and/or centering of the involved structural parts.

If the second structural part has a conical tapering section on its side facing towards the tool, then this can be utilised to facilitate the centering of the microfluidic structural part.

For example, it may be envisaged that the second structural part drives into a cylindrical opening of the structural part, in the region of which the foil-like or membrane-like part is to be placed and/or fastened. An extremely accurate centering is thus possible in this region.

In order to obtain a clean cut edge of the foil-like or membrane-like part it is envisaged that a surrounding gap is provided between the tool for separating the foil-like or membrane-like part and the through opening of the first structural part, the gap having a size ranging from about 1 µm to 30 µm, preferably about 3 µm to 20 µm.

Figure 2:
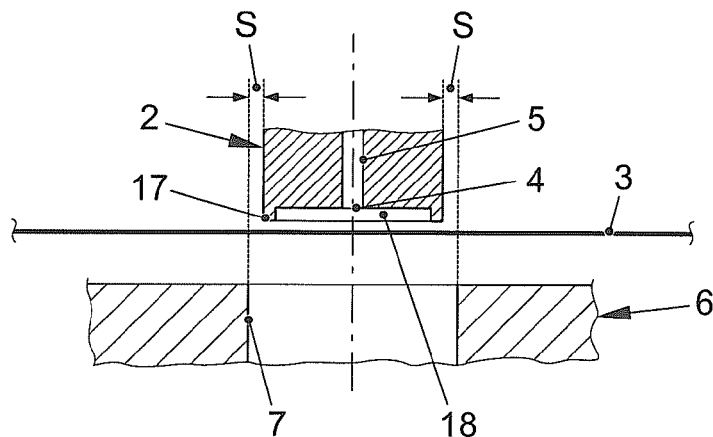
Figure 3:
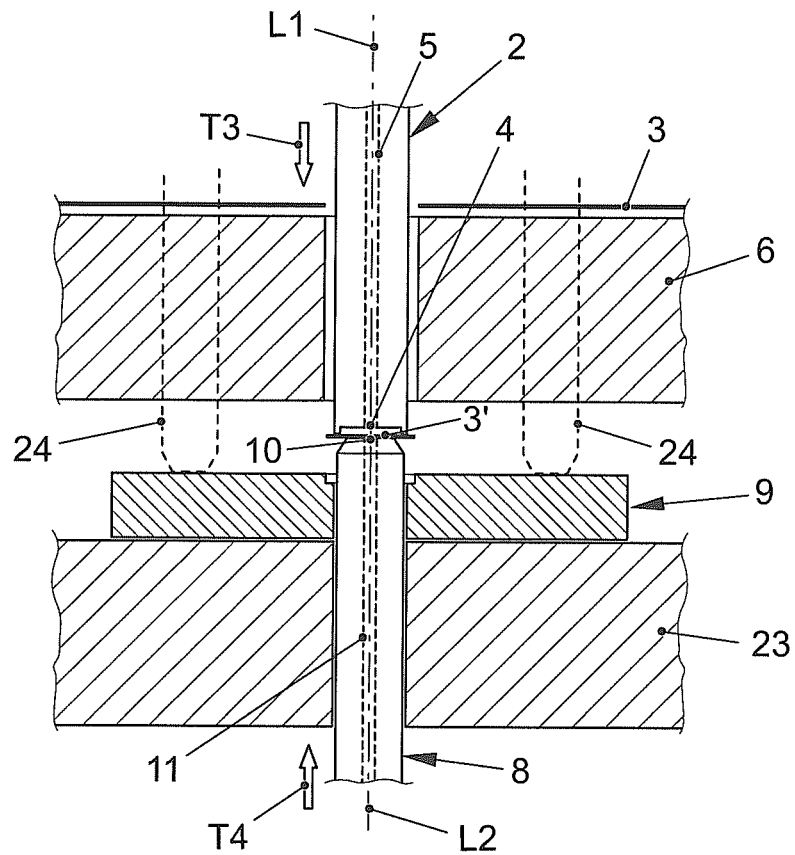
Figure 4:
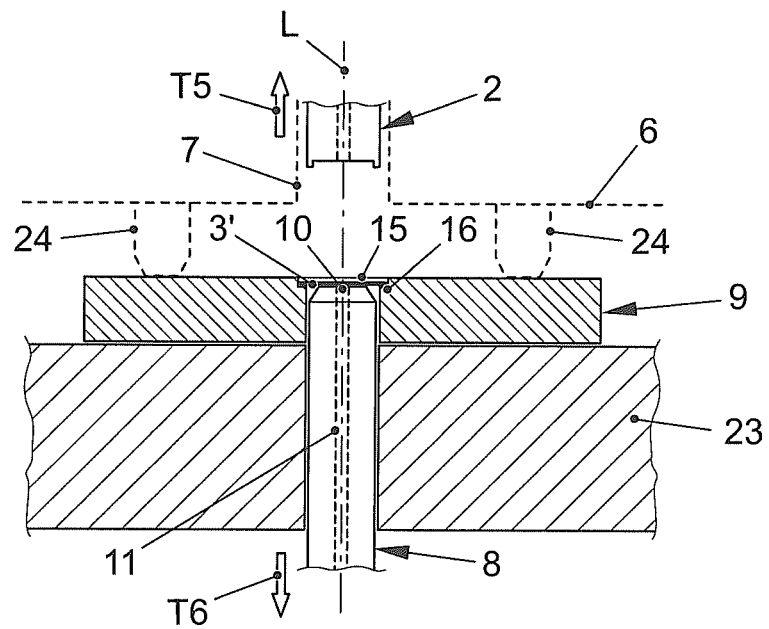
Figure 5:
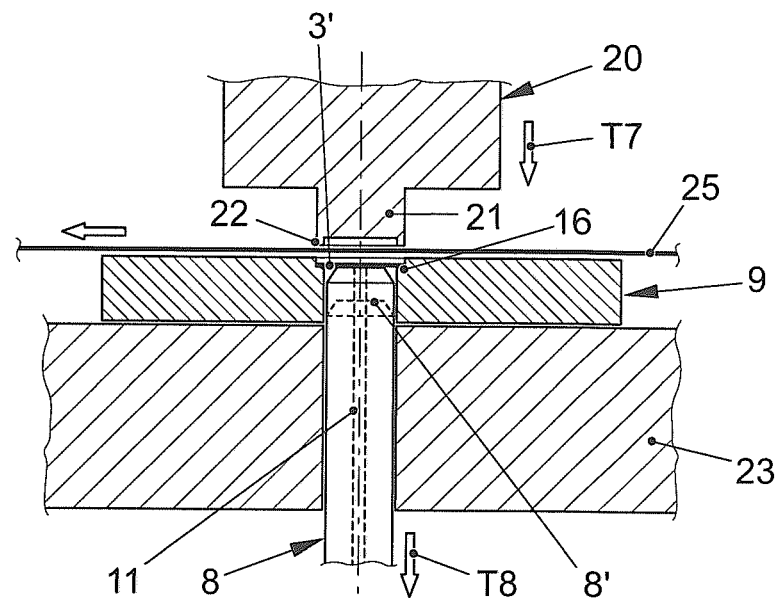
Figure 6:
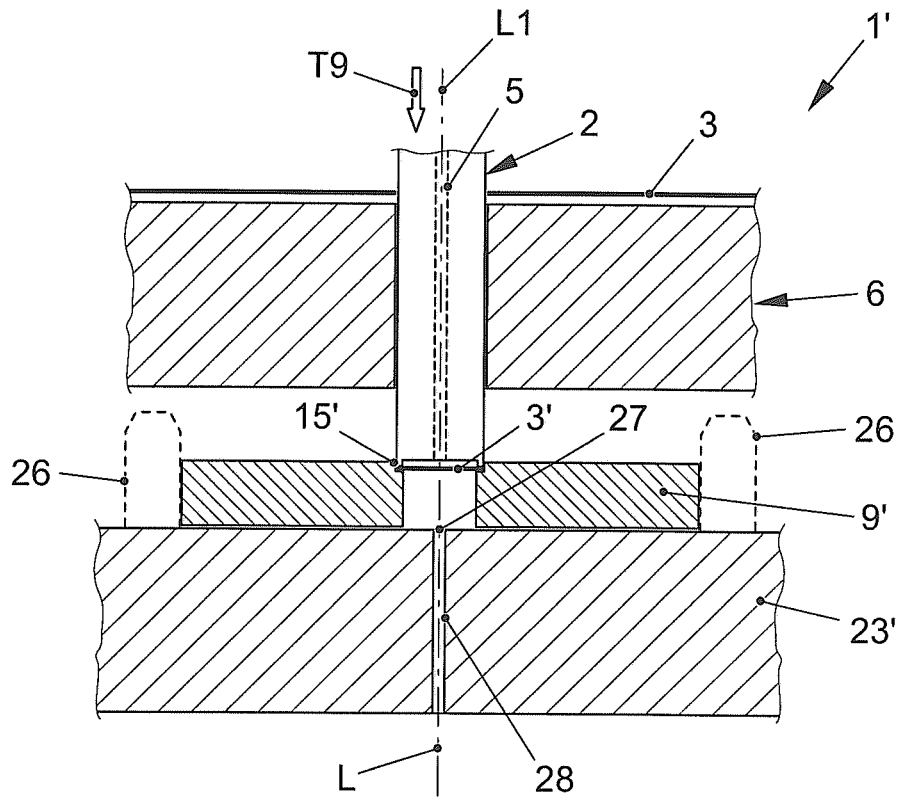

Further advantages and modifications of the invention will become apparent with the aid of exemplary embodiments, which will be described in more detail with the aid of the accompanying drawings in which:

FIG. 1 is a principal cross-sectional representation of a device according to the invention for carrying out the method of the invention according to a first embodiment, before production of the foil-like or membrane-like part, FIG. 2 is an enlarged representation according to the detailed view II of FIG. 1, FIG. 3 is a principal cross-sectional representation of the device according to FIG. 1, in which the foil-like or membrane-like part has been separated from the semi-finished product and has been transferred to a second structural part serving for the centering, FIG. 4 is a principal representation of the device according to FIG. 1, in which the foil-like or membrane-like part has been placed by means of the second structural part on a microfluidic structural part, FIG. 5 is a principal cross-sectional representation of the device according to FIG. 1, in which a tool for joining the foil-like or membrane-like part to the microfluidic structural part is brought into position, and FIG. 6 is a principal cross-sectional representation of a device for carrying out the method according to the invention according to a second embodiment.

Reference will first of all be made to FIGS. 1 and 2.

These Figures show a device 1 for carrying out the method, which comprises a tool 2 for separating the foil-like or membrane-like part from a semi-finished product 3, a first structural part 6 for the seating of the semi-finished product 3, a second structural part 8 for the alignment and/or centering of a microfluidic structural part 9, as well as a second structural part 23 serving to support the microfluidic structural part 9.

Furthermore a tool 20 for joining the foil-like or membrane-like part to the microfluidic structural part 9 is also partly shown.

The tool 2 for separating the foil-like or membrane-like part from the semi-finished product 3 as well as the second structural part 8 for the alignment and centering of the microfluidic structural part 9 are elongated structural parts, having in each case a circular cross-section and a longitudinal mid-axis L1 and L2. The longitudinal mid-axes L1 and L2 lie on a common straight line L.

During the implementation of the method the structural parts 2 and 8 execute translational movements T1 and T2 respectively. The structural part 6 for the seating of the semi-finished product 3 as well as the second structural part 23 serving to support the microfluidic structural part 9 are plate-shaped or also block-shaped. In this connection the structural part 6 is provided with a circular through opening 7 for the possible passage of the tool 2 and the second structural part 23 is likewise provided with a circular through opening 19 for the passage of the structural part 8.

Although the structural parts 2 and 8 in the present embodiment have a circular cross-section and the through openings 7 and 19 are correspondingly circular, other cross-sectional shapes (for example square) are however also conceivable. The same also applies to a through opening 14 of the microfluidic structural part 9.

In the chosen representation the microfluidic structural part 9 has on its upper surface a depression 15, which is likewise circular and in diameter is somewhat larger than the through opening 14. A surrounding shoulder 16 is thereby formed. The depression 15 serves subsequently for receiving the foil-like or membrane-like part that has been separated from the semi-finished product 3 by means of the tool 2 (compare 3' in FIGS. 3 and 4).

It can be seen that the tool 2 is provided with a channel 5 running substantially concentrically to the longitudinal mid-axis L1, the channel terminating in an opening 4. The opening 4 is located on the side facing towards the semi-finished product 3 and the first structural part 6 for the seating of the semi-finished product 3. The channel 5 is fluid mechanically connected to a vacuum or compressed air source, not shown in more detail, for generating a reduced pressure or excess pressure respectively.

It is also evident from FIG. 2 that the tool 2 is provided with a raised portion 17 running along the edge. A depression 18 on the front side of the tool 2 is thereby formed.

The diameter of the tool 2 is slightly less than the diameter of the through opening 7, so that a surrounding clearance S is formed between the tool 2 and the structural part 6. In this connection the clearance is preferably of an order of magnitude of about 1 μm to 30 μm, particularly preferably about 3 μm to 20 μm.

It can furthermore be seen that the second structural part 8 similarly comprises a channel 11, which runs somewhat concentrically to its longitudinal mid-axis L2 and can likewise be connected to a vacuum source or compressed air source, not shown, in order to generate a reduced pressure or excess pressure respectively. In the illustration according to FIG. 1 the channel 11 terminates on its upper side, i.e. on the side facing towards the semi-finished product 3 and the structural part 6, in an opening 10.

In addition it is evident that the second structural part 8 is provided in the region of the opening 10 with a concial tapering portion 12.

Finally, the tool 20 for joining the foil-like or membrane-like part to the microfluidic structural part (see also FIG. 5) will now be briefly described.

The tool 20 comprises a readily heatable metal block, for example of copper, steel or aluminium, which is provided on its lower side, i.e. on the side facing towards the semi-finished product 3 and the structural parts 9 or 23, with a projecting region 21. The projecting region 21 likewise has a circular cross-section and is provided on its lower side with a raised portion 22 running along the edge.

The raised portion 22 running along the edge ensures that a heating of the foil-like or membrane-like part 3' and thus a joining to the microfluidic structural part 9, especially in the region of the surrounding shoulder 16 of the depression 15, can occur only in the edge region of the separated foil-like or membrane-like part 3' (see FIG. 5).

It should also be noted again that the representations shown in FIGS. 1 to 6 are simply extremely illustrative. Thus, for example, for a better understanding a spacing is shown between the semi-finished product 3 (preferably formed as an endless strip) and the structural part 6 for the seating of the semi-finished product 3. In actual fact the semi-finished product 3 lies of course on the structural part 6. Moreover, essentially only the structural parts necessary for the understanding of the invention are shown. Other necessary structural parts, such as for example transport devices for the further transport of the strip-shaped semi-finished product 3 or for transporting the microfluidic structural parts 9 to and from the device 1 according to the invention, are not shown in more detail.

In FIG. 3 a method step is now shown, in which the tool 2 has separated a foil-like or membrane-like part 3' from the semi-finished product 3 by a downwards directed translational movement T3. In this connection the tool 2 is driven completely through the through opening 7 of the structural part 6.

At the moment of separation or already just before this the channel 5 of the tool 2 is connected to a vacuum source, so that a reduced pressure is generated at the opening 4. In this way the separated foil-like or membrane-like part 3' is held securely on the tool 2.

Moreover it is evident that also the second structural part 8 has executed a translational movement T4, and specifically in the direction of the tool 2, i.e. upwards.

At the moment when the second structural part 8 touches the foil-like or membrane-like part 3' from below, or shortly before this moment, the channel 11 in the second structural part 8 is likewise connected to a vacuum source, so that the opening 10 is under a reduced pressure.

At the same time the channel 5 in the tool 2 is separated from the vacuum source and thus the reduced pressure initially existing at the opening 4 is deactivated. In this way the foil-like or membrane-like part 3' in the region of the opening 10 is now held from the second structural part 8 and is transferred thereto. Due to the depression 18 formed on the tool an extremely "gentle" transfer for the foil-like or membrane-like part 3' is therefore possible.

In addition it can also be envisaged here that at the moment of the transfer, the channel 5 is not only separated from the vacuum source and thereby the reduced pressure at the opening 4 is lifted, but that in addition an excess pressure (for example a compressed air jet) is briefly generated at the opening 4 by means of a suitable source. In this way the transfer of the foil-like or membrane-like part 3' from the tool 2 to the second structural part 8 can take place even more reliably and uniformly. At the same time the compressed air can expand very efficiently within the depression 18.

It should also be pointed out once more that before the transfer of the foil-like or membrane-like part 3' to the structural part 8 by the latter (8), in particular by its conical tapering part 12, a centering of the microfluidic structural part 9 is performed particularly in the region of its through opening 14 with respect to the tool 2 and thus with respect to the foil-like or membrane-like part 3'.

The diameter of the through opening 14 therefore corresponds roughly to the diameter of the structural part 8 at its cylindrical section, i.e. the section following the conical tapering portion 12.

Finally, the through openings 14 and 19 should be formed so that on the one hand an unhindered translational movement of the structural part 8 through these openings is possible, and that on the other hand a sufficient centering of the microfluidic structural part 9 by the structural part 8 can also be carried out.

After centering of the microfluidic structural part 9 an additional securement can be performed by clamping means 24 (shown by dotted lines).

FIG. 4 now shows a further method step, in which the foil-like or membrane-like part 3' has been placed on the microfluidic structural part 9, and more specifically in the region of the surrounding shoulder 16 of the depression 15.

For this purpose the structural part 8, after the transfer of the foil-like or membrane-like part 3' to this (8), executes a translational movement T6 in the downwards direction until the foil-like or membrane-like part 3' abuts with its edge region on the surrounding shoulder 16. During this time a reduced pressure is present furthermore at the channel 11 and thus at the opening 10, so that the foil-like or membrane-like part 3' is reliably held on the structural part 8.

The tool 2 on the other hand after the transfer executes in turn a translational movement T5 in the opposite direction upwardly through the through opening 7.

As can be seen in FIG. 5, the tool 20 (thermode) is then aligned with its projecting region 21 concentrically with respect to the foil-like or membrane-like part 3', and is guided in a translational, downwards movement T7 with its surrounding raised edge portion 22 onto the edge region of the foil-like or membrane-like part 3'. By application of pressure and heat for a suitable time the foil-like or membrane-like part 3' and the microfluidic structural part 9 consisting of plastics material are now joined in the region of the surrounding shoulder 16.

It has proved convenient in this connection if the tool 20 is heated to a temperature in a range from about 193° C. to 199° C. and a compressive force in the range from about 294 N to 339 N acts on the foil-like or membrane-like part 3'. In this connection a duration of about 3 sec to 3.2 sec during which the tool 20 acts on the foil-like or membrane-like part 3' has proved particularly advantageous.

At the moment the raised edge portion 22 comes into contact with the foil-like or membrane-like part 3' this (3') is held sufficiently securely on the microfluidic structural part 9. Accordingly the structural part 8 can be driven downwardly (position 8') in a downwards translational movement T8 by adjusting the reduced pressure acting in the channel 11. In addition it is also possible in this connection to connect the channel 11 briefly to a source of excess pressure, for example to a compressed air source.

In order to reduce the danger of the foil-like or membrane-like part 3' becoming attached to the heated tool 20, the insertion of a separating layer 25 (for example of Teflon) may be envisaged. This separating layer 25 can preferably also be provided in the form of an endless strip. Alternatively, it is also possible to provide the tool 20, at least on the region of the raised edge portion 22, with an appropriate coating.

After the joining of the foil-like or membrane-like part 3' to the microfluidic structural part 9 the structural part 8 moves downwardly so far in the structural part 23 that the microfluidic structural part 9 can be transported further by means of suitable transporting means (not shown) and, after an appropriate realignment of the tool 2 with respect to the structural part 8, the method can begin again for a further microfluidic structural part 9.

The alignment between the tool 2 and/or the tool 20 in relation to the structural part 8 can obviously be carried out by various ways and means. For example, it is conceivable that simply the structural parts 23 and 8, or also only the tool 2 and 20, are moved for this purpose. A combination of these movements is also possible.

Instead of joining the foil-like or membrane-like part 3' to the microfluidic structural part 9 by means of heat sealing, as outlined hereinbefore, other joining methods are obviously also conceivable. For example a joining can also be carried out by means of bonding or ultrasound welding.

Finally, FIG. 6 shows a second embodiment of a device 1' according to the invention. The same structural parts are in this connection provided with the same reference numerals.

In this case a foil-like or membrane-like part 3' already separated from a semi-finished product 3 in a previous method step is to be joined to a structural part 9', in which connection the permitted tolerances for the placement of the foil-like or membrane-like part 3' in a corresponding depression 15' of the structural part 9' should, on account of the larger dimensions, be in such a range that the alignment and centering of the structural part 9' does not have to be quite so accurate. Instead, an alignment and centering by means of centering aids 26 (shown by dotted lines) is sufficient, which can for example be provided on a second structural part 23' serving for the support and also the alignment and centering of the structural 9'.

In FIG. 6 the tool 2 has already executed a downwards translation movement T9 and has separated the foil-like or membrane-like part 3' from the semi-finished product 3. Again, a reduced pressure exists at the channel 5, so that the foil-like or membrane-like part 3' is securely held on the tool 2.

The tool 2 moves downwards until it places the foil-like or membrane-like part 3' on the structural part 9' in the region of the depression 15'.

At this moment the reduced pressure in the channel 5 is again adjusted and a channel 28 in the structural part 23' is connected to a vacuum source (not shown), so that a reduced pressure again exists at an opening 27 of the structural part 23'. As a result of this reduced pressure the foil-like or membrane-like part 3' is now securely held on the structural part 9'.

Following this a thermode (see 20, FIG. 5) can again be aligned with respect to the foil-like or membrane-like part 3' and used to join this part (3') to the structural part 9' in the manner already described

LIST OF REFERENCE NUMERALS 1,1' Device for carrying out the method
2 Tool for separating the foil-like or membrane-like part from the semi-finished product
3 Semi-finished product
3' Foil-like or membrane-like part separated from the semi-finished product
4 Opening in the tool
5 Channel in the tool
6 First structural part for the seating of the semi-finished product
7 Through opening in the first structural part
8 Second structural part for the alignment and centering of the microfluidic structural part
9 Microfluidic structural part
9' Structural part
10 Opening in the second structural part
11 Channel in the second structural part
12 Conical tapering portion on the second structural part
14 Through opening in the microfluidic structural part
15,15' Depression in the microfluidic structural part
16 Surrounding shoulder in the microfluidic structural part
17 Surrounding raised edge portion of the tool
18 Front-face depression of the tool
19 Through opening in the second structural part serving to support the microfluidic structural part
20 Tool for joining the foil-like or membrane-like part to the microfluidic structural part
21 Projecting region of the tool
22 Surrounding raised edge portion of the projecting region of the tool
23 Second structural part serving to support the microfluidic structural part
23' Second structural part serving to support and also align and centre the microfluidic structural part
24 Clamping means 25 Separating layer
26 Centering aids on the second structural part serving to support and also align and centre the microfluidic structural part
27 Opening in the second structural part serving to support and also align and centre the microfluidic structural part
28 Channel in the second structural part serving to support and also align and centre the microfluidic structural part
L1 Longitudinal mid-axis of the tool
L2 Longitudinal mid-axis of the second structural part
L Common straight line of the longitudinal mid-axes
S Surrounding clearance
T1-T9 Translational movements

What is claimed is:

1. A method for joining at least one foil-like or membrane-like part (3') to a microfluidic structural part (9,9') wherein the foil-like or membrane-like part (3') is held on a semi-finished product (3) which comprises the steps of:
    (a) separating the foil-like or membrane-like part (3') from the semi-finished product (3) by means of a separation tool (2) wherein the foil-like or membrane-like part (3') is held on the separation tool (2) by means of a partial vacuum or reduced pressure;
    (b) transferring the foil-like or membrane like part (3') to an alignment component (8);
    (c) holding the foil-like or membrane-like part (3') to the alignment component (8) by application of a second partial vacuum or reduced pressure;
    (d) positioning the foil-like or membrane like part (3') that is held on the alignment component (8) in position for alignment and centering on the microfluidic structural part (9,9'); and
    (f) joining the foil-like or membrane-like part (3') to the microfluidic structural part (9,9'), wherein said microfluidic structural part contains at least one micro-channel or at least one micro-chamber.

2. The method according to claim 1, characterized in that the foil-like or membrane-like part (3') is released from the separation tool (2) by applying excess pressure, by means of at least one compressed air jet.

3. The method according to claim 1, characterized in that the foil-like or membrane-like part (3') is thermally joined to the microfluidic structural part (9, 9') by applying heat and pressure.

4. The method according to claim 3, characterized in that a joining tool (20) is brought to a temperature in a range from about 100° C. to 220° C. in order to thermally join the foil-like or membrane-like part (3') to the microfluidic structural part (9,9').

5. The method according to claim 4, wherein the joining tool (20) is brought to a temperature of about 193° C.

6. The method according to claim 4, characterized in that for pressure generation, the joining tool (20) acts on the foil-like or membrane-like part (3') with a compressive force in the range from about 50 N to 900 N.

7. The method according to claim 3, characterized in that in order to generate the heat and the pressure the joining tool (20) acts on the foil-like or membrane-like part (3') for a duration of about 2.5 sec to 3.5 sec.

8. The method according to claim 4, characterized in that a separating layer (25) is inserted between the joining tool (20), and the foil-like or membrane-like part (3').

9. The method according to claim 1, characterized in that the separation of the foil-like or membrane-like part (3') from the semi-finished product (3) is achieved with a clearance (S) that is many times smaller than the thickness of the foil-like or membrane-like part (3'), and is in a range from about 0.03 to 0.3 times its thickness.

* * * * *